Sept. 1, 1964  G. GEYDUSCHEK  3,146,583
EXPANDING BRACELET
Filed March 5, 1962
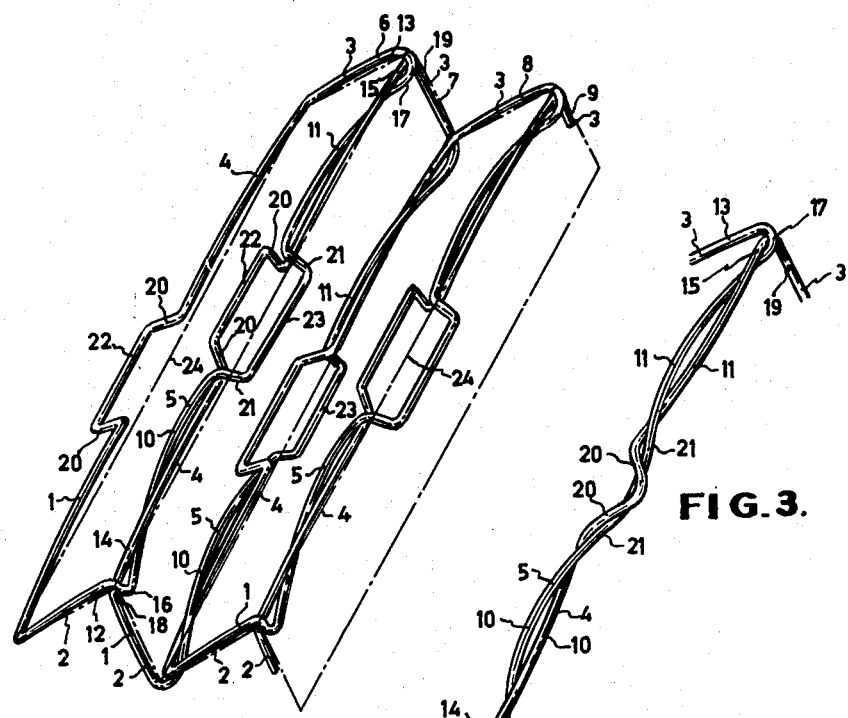
FIG.1.
FIG.3.
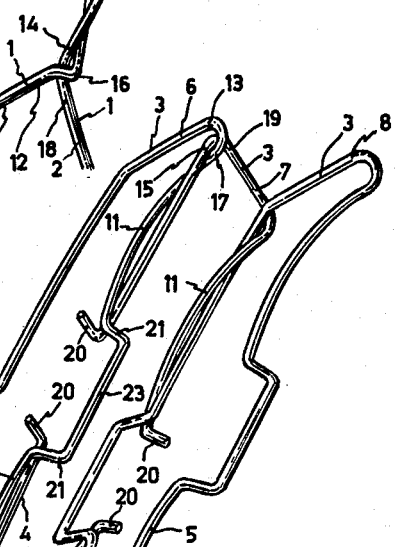
FIG.2.
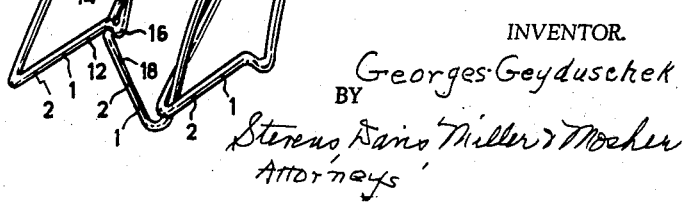
FIG.4.
INVENTOR.
Georges Geyduschek
BY
Stevens Davis Miller & Mosher
Attorneys

United States Patent Office 3,146,583
Patented Sept. 1, 1964

3,146,583
EXPANDING BRACELET
Georges Geyduschek, 5 Rue des Egyptiens,
Brussels 5, Belgium
Filed Mar. 5, 1962, Ser. No. 177,292
Claims priority, application, Belgium, Mar. 7, 1961,
478,207, Patent 601,019
6 Claims. (Cl. 59—79)

This invention relates to an expanding bracelet which is comprised of a series of elements which are joined together by resilient connections which work as springs and which thus leave some movement freedom to each element.

In the bracelet according to the invention, each element is generally shaped as an elongated rectangular frame, which is preferably closed, which is made by bending a metal wire and which is located, when the bracelet is not subjected to an expanding force, in a plane which is in substantially parallel relationship with the planes of the adjacent frames in such a way that the short sides thereof form the bracelet edges, while the long sides thereof are located one on the inside and the other on the outside of the bracelet and are joined by twisting, respectively, one with the long outwards side of an adjacent element and the other with the long inwards side of the other adjacent element, the twist-joints being so made that two adjacent elements can swivel relative to one another.

Moreover, the long frame sides are slightly curved and are thus located outside of the swivelling geometrical axis, in such a way that rotating of the elements around these axes is accompanied by some straightening of the long sides thereof, which causes a spring action which tends to bring the elements back to the original position thereof.

According to a preferred embodiment of the invention, one element long side, twisted around one long side of an adjacent element, is provided with two symmetrical helixes which are wound in opposite directions and which have at least one complete turn around the long side of the adjacent element they surround, in such a way that two adjacent elements can only be separated from one another with a tool which enables to open said helixes.

Other details and features of the invention will stand out from the description given below by way of non-limitative example and with reference to the accompanying drawings, in which:

FIG. 1 is a perspective view showing some elements as they lie when the bracelet is expanded.

FIG. 2 is a side view of some elements as they lie in their normal position when the bracelet is not expanded.

FIG. 3 shows in perspective another way of joining two adjacent elements.

FIG. 4 shows in perspective another embodiment of an element, the frame of which is open.

In the various figures, the same reference numerals pertain to similar elements.

The expanding bracelet shown in the drawings is comprised of a series of elements joined together by resilient connections with spring action, which thus leave some movement freedom to each element.

According to the invention, each element is generally shaped as an elongated rectangular frame 1, which is made by bending a metal wire and which is located, when the bracelet is not subjected to an expanding force, into a plane which is in substantially parallel relationship with the planes of the adjacent element frames 1. The short sides 2 and 3 of the elements form the bracelet edges, while the long sides 4 and 5 thereof lie, alternatively, one on the outside, the other on the inside of the bracelet and they are joined by twisting, in such a way that two adjacent elements, for instance 6 and 7, 7 and 8, or 8 and 9, etc. (FIGURES 1 and 2) can swivel relative to one another. The elements are thus arranged zig-zag fashion and the long side 4 of element 7, for instance, is located outwards and is joined with the long side 5 of element 6, which is also located outwards, while the long side 5 of element 7 located inside of the bracelet is joined to the long side 4 of element 8, which is also located inwards.

The twisting can of course be made in various ways. In the embodiment shown in FIGURE 3, the two long sides 4 and 5 belonging to two adjacent elements are twisted together. In the embodiment shown in FIGURES 1 and 2, the long side 5 only is twisted.

Whatever the embodiment, one long side of an element twisted around one long side of an adjacent element, is provided with two symmetrical helixes 10 and 11 wound oppositely and which have each at least one complete turn around the long side of the adjacent element they surround. In such a way, two adjacent elements can only be separated from one another by means of an adequate tool for opening the helixes 10 and 11.

As shown in the drawings, in each element the ends 12 and 13 of the short sides 2 and 3, which are extended by the helixes 10 and 11, respectively, are wound around the ends 14 and 15 of the long side 4 of the adjacent element, surrounded by the helixes 10 and 11, and they serve consequently as hinges 16 and 17, while the long side 4 serves as common axis to both hinges 16 and 17.

According to a preferred embodiment of the invention, in each element the ends 14 and 15 of the long side 4, serving as common axis to both hinges 16 and 17 and which are bent at the outlet from these hinges to form the short sides 2 and 3 of the frame, are bent at right angle with a rounding smaller than the wire radius. The ends 18 and 19 of the short sides 2 and 3 form consequently two outside stops that prevent the sidewise sliding of the joined elements.

Besides the outside stops 18 and 19, in each element the long sides 4 and 5 are each provided with two projections 20 and 21, respectively, which are so located that when the elements are joined, the projections 20 for instance, which are on the long side 4, are located between the projections 21 on the long side 5 which is part of the adjacent element and contact them, so that any sidewise movement of the elements is prevented.

In the particular embodiment shown in the drawings, the projections 20 and 21 are the lateral sides of the rectangular loops 22 and 23 formed by bending the long sides 4 and 5 of each frame.

FIGURE 4 shows another embodiment in which, the frame 1 being open, the wire that comprises the frame is so interrupted that the top of the rectangular loop 22 does not exist.

It is particularly to be noted that the long sides 4 and 5 of the frames are slightly arched and thus lie somewhat outside the geometrical swivelling axis 24, in such a way that rotating of the elements around these axis is accompanied by some straightening of the long sides thereof, which causes a spring action which tends to bring the elements back to their original position.

It must be understood that the invention is in no way limited to the above embodiments and that many changes may be brought therein without departing from the scope of the invention as defined by the appended claims.

I claim:

1. In an expansion bracelet made of metal wire comprising a plurality of rectangular shaped frames disposed in substantially parallel planes when said bracelet is in an unexpanded position, said frames comprising spaced short and long sides, said adjacent long sides of adjacent frames being twisted together for swivelling movement about a common geometrical axis in a zig-zag configuration with said short sides forming the opposite edges of the bracelet.

2. Bracelet as claimed in claim 1, in which the long frame sides are slightly curved and are thus located outside of the swivelling geometrical axis, in such a way that rotating of the elements around these axes is accompanied by some straightening of the long sides thereof, which causes a spring action which tends to bring the elements back to the original position thereof.

3. Bracelet as claimed in claim 1, in which one element long side, twisted around one long side of an adjacent element, is provided with two symmetrical helixes which are wound in opposite directions and which have at least one complete turn around the long side of the adjacent element they surround, in such a way that two adjacent elements can only be separated from one another with a tool which enables to open said helixes.

4. Bracelet as claimed in claim 3, in which in each element the ends of the short sides, which are extended by said helixes, are wound around the ends of the long side of the adjacent element surrounded by said helixes and serving consequently as hinges, while said long side serves as common axis to both hinges.

5. Bracelet as claimed in claim 4, in which in each element the ends of the long side serving as common axis to both hinges and bent as they come out of said hinges to form the shorter sides of the frame, are bent at right angle with a rounding smaller than the wire radius and they form consequently two outside stops that prevent a sidewise sliding of the joined elements.

6. Bracelet as claimed in claim 1, in which in each element the long sides are each provided with at least two projections which are so located that when the elements are joined, the projections on one of the two long sides which are joined are located between the two projections of the other long side which is part of the adjacent element, and they so engage them that any sidewise movement of the elements is prevented.

References Cited in the file of this patent
UNITED STATES PATENTS

| | | |
|---|---|---|
| 750,112 | King | Jan. 19, 1904 |
| 904,846 | Costello | Nov. 24, 1908 |
| 1,943,446 | Land | Jan. 16, 1943 |